(12) United States Patent
Hoshi

(10) Patent No.: US 6,539,057 B1
(45) Date of Patent: *Mar. 25, 2003

(54) CODING APPARATUS PROVIDING IMPROVED ACCESS TO SELECTED CODED DATA

(75) Inventor: Hidenori Hoshi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,955

(22) Filed: Oct. 7, 1997

Related U.S. Application Data

(63) Continuation of application No. 08/168,996, filed on Dec. 20, 1993, now abandoned.

(30) Foreign Application Priority Data

Dec. 22, 1992 (JP) ............................................. 4-342189

(51) Int. Cl.[7] ................................................. H04N 7/12
(52) U.S. Cl. .................................. 375/240.24; 386/112
(58) Field of Search ............................. 386/6, 7, 8, 33, 386/40, 68–81, 109, 111, 112, 124, 125, 126; 360/32, 48; 375/240.24; 714/799; H04N 7/12

(56) References Cited

U.S. PATENT DOCUMENTS

| | | | | | |
|---|---|---|---|---|---|
| 5,068,744 | A | * | 11/1991 | Ito | ................ 386/33 |
| 5,239,308 | A | * | 8/1993 | Keesen | ........................ 341/67 |
| 5,329,375 | A | * | 7/1994 | Juri et al. | .................... 358/343 |
| 5,351,131 | A | * | 9/1994 | Nishino et al. | ............. 358/335 |
| 5,703,889 | A | * | 12/1997 | Shimoda et al. | ............ 714/799 |

FOREIGN PATENT DOCUMENTS

| | | | | |
|---|---|---|---|---|
| JP | 3-78380 | 4/1991 | ............ | H40N/5/92 |
| JP | 4-10879 | 1/1992 | ............ | H40N/5/92 |

* cited by examiner

*Primary Examiner*—Young Lee
(74) *Attorney, Agent, or Firm*—Fitzpatrick, Cella, Harper & Scinto

(57) ABSTRACT

A coding apparatus includes a block forming unit which divides an input image signal into m, where m is an integer, blocks. A coder uses an orthogonal transformation to compression code the m blocks of data. A producing unit produces n, where n is an integer, sync blocks from the coded data of m blocks. Each of the sync blocks has a first area of a fixed length in which a low frequency component in the orthogonal coded data of a specific number of blocks is arranged, and a second area of a fixed length in which a high frequency component in the orthogonal transformation coded block data of an unspecific number of blocks is arranged.

10 Claims, 7 Drawing Sheets

CODING APPARATUS PROVIDING IMPROVED ACCESS TO SELECTED CODED DATA

This application is a continuation of application Ser. No. 08/168,996 filed Dec. 20. 1993, now abandoned.

BACKGROUND OF THE INVENTION

1. Field of the Invention

The invention relates to a coding/decoding apparatus and, more particularly, to an apparatus for variable length coding image data after it has been orthogonal transformed on a block unit basis comprising a predetermined number of pixels and to a decoding apparatus for decoding the coding data which was coded by the coding apparatus.

2. Related Background Art

Generally, since the amount of information for an image signal is very large, in the case of recording the image signal by a digital recording and reproducing apparatus such as a digital VTR or the like, the amount of information is reduced by a highly efficient compression coding and the reduced image signal is recorded.

An orthogonal transformation coding using a DCT (Discrete Cosine Transform) is known as an example of the highly efficient compression coding techniques.

According to the orthogonal transformation coding, an input image signal is separated into blocks and each of the frequency components obtained by frequency dividing the image signal on such a block unit basis is coded. By using a method such that the amount of data which is allocated is reduced or the like with respect to the high frequency component whose influence on the deterioration of visual characteristics is small, the amount of information of the input image signal can be reduced.

The case where the signal which was compression coded by the above method is recorded and reproduced by the digital VTR will now be described.

When the coded data is recorded onto a tape, it is separated into sync blocks of a predetermined data amount unit as a minimum synchronous unit in the reproducing mode and the data is recorded.

FIG. 1 shows a construction of a sync block.

In FIG. 1, SYNC 1 denotes a synchronization pattern, ID 2 indicates identification information comprising address information or the like to indicate the position on the screen of the data recorded, and DATA 3 denotes image data which was compression coded.

FIG. 2 shows an arrangement on the tape of the sync blocks recorded by a conventional VTR.

Reference numerals 2a, 2b, and 2c in FIG. 2 denote tracks. The sync blocks are arranged in those tracks.

Each track is a locus of a recording head in the recording mode. In the normal reproducing mode, a reproducing head scans on the same locus as the locus which was scanned by the recording head in the recording mode, so that the image data in each sync block can be reproduced.

A method of reproducing the recording data in a special reproducing mode will now be described.

In FIG. 2, reference numeral 10 denotes a locus of the reproducing head in a high speed searching mode, one of the special reproducing modes.

Since a tape travelling speed in the high speed searching mode is faster than that in the normal reproducing mode, the locus 10 of the reproducing head is a locus such that the reproducing head scans a plurality of tracks.

Therefore, the data of only those sync blocks shown by hatched regions in FIG. 2 can be extracted from the tape by the reproducing head.

In the above conventional recording/reproducing method of image data mentioned above, however, a sync block in which only a part can be scanned exists in the reproducing head locus 10.

For example, there is a sync block like a sync block 11 in FIG. 2 such that the whole portion cannot be scanned although the front portion of the sync block can be scanned. Therefore, since the data arranged in the rear portion in the sync block 11 cannot be fetched, there is a problem such that the data which is necessary for the expanding process cannot be prepared and the image data existing in the sync block 11 cannot be reproduced.

In the case where a transmission error exceeding an error correction ability occurs on a transmission path, there is also a problem such that the data after the position at which the transmission error occurred cannot be reproduced and the data of a fixed length unit disappears in the worst case.

SUMMARY OF THE INVENTION

Under such circumstances, it is an object of the invention to provide a coding/decoding apparatus which can reproduce a wider region on a screen than that of a conventional apparatus in the case of the occurrence of a transmission error or in a special reproducing mode and which can minimize the deterioration of picture quality.

According to one preferred embodiment, the above object is accomplished by a coding apparatus comprising: block forming means for dividing an input 20 image signal into blocks; coding means for compression coding the block data obtained by dividing by the block forming means by using an orthogonal transformation; and generating means for generating (n) sync blocks from the coding data of (m) blocks, wherein each sync block has a first area in which important data for the orthogonally transformed coded block data for a special number of blocks is arranged and a second area in which non-important data for the orthogonally transformed coded block data for an unspecified number of blocks is arranged.

According to another preferred embodiment, there is provided a decoding apparatus in which an image signal is divided into blocks and the block-formed block data is compression coded and the compression coded block data is decoded on an (m) unit basis (m is a natural number), wherein the decoding apparatus comprises: first decoding means for decoding the coding data of the (m) inputted blocks on a block unit basis in accordance with the inputting order; second decoding means for decoding the coding data of the (m) inputted blocks on a block unit basis in accordance with the reversed inputting order; and output means for integrating -the data decoded by the first and second decoding means and for outputting the decoding data of the (m) blocks.

The above and other objects and features of the invention will become apparent from the following detailed description taken in conjunction with the appended claims with reference to the accompanying drawings.

DETAILED DESCRIPTION OF THE PREFERRED EMBODIMENTS

A digital recording/reproducing apparatus according to an embodiment of the invention will now be described hereinbelow.

Figure 3:
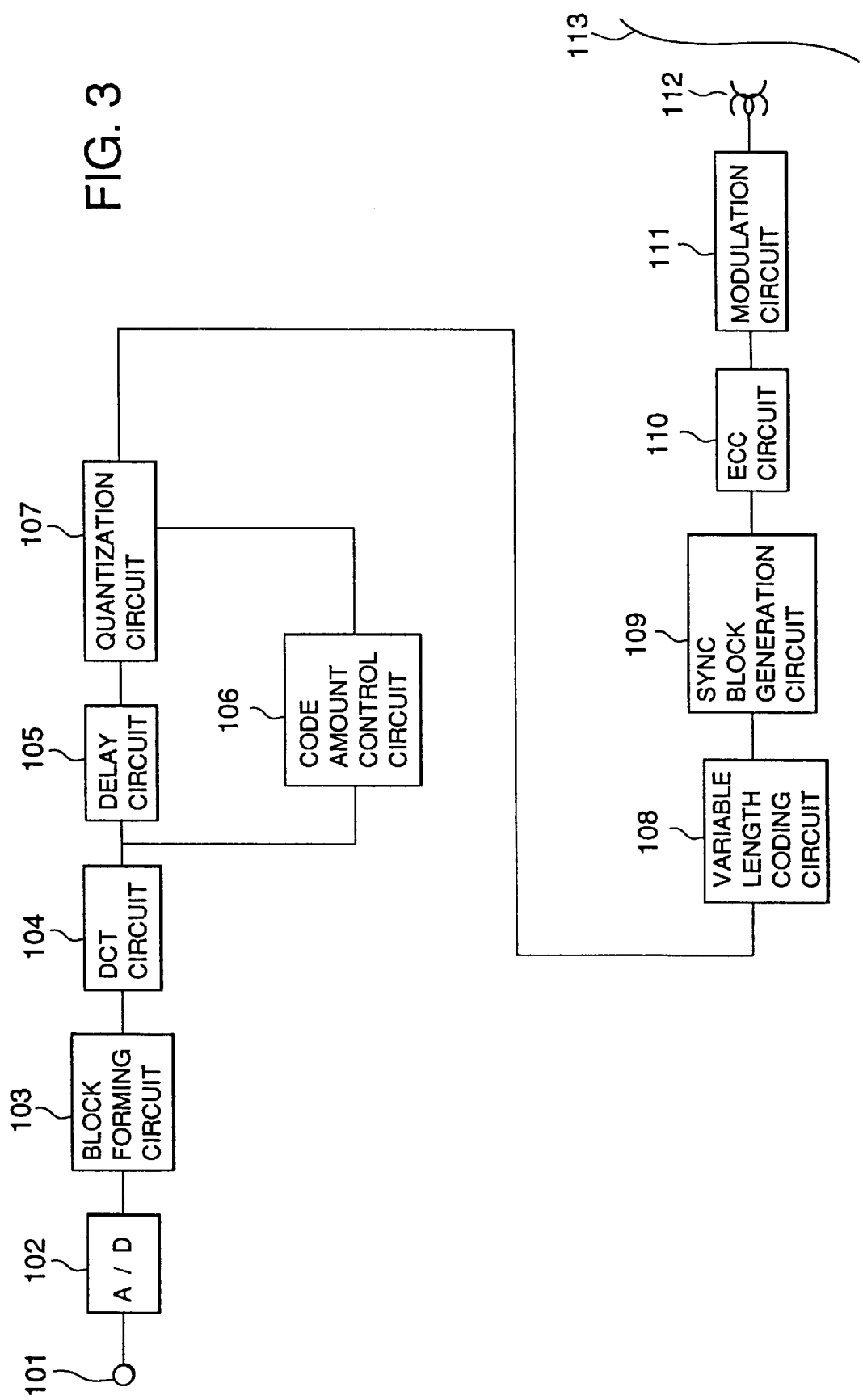
FIG. 3 is a block diagram of a digital recording apparatus of an embodiment according to the invention.

FIG. 3 is a block diagram of a digital recording apparatus of the embodiment.

An image signal inputted from an input terminal 101 is converted into a digital image signal by an A/D converting circuit 102.

The converted digital image signal is divided into blocks on a DCT processing unit basis by a block forming circuit 103. In the embodiment, a 2-dimensional block (hereinbelow, referred to as a DCT block) of total 64 pixels (8 pixels in the lateral direction×8 pixels in the vertical direction) is used.

The DCT block formed image signal is converted into DCT components by a DCT circuit 104. The block data which was converted into the DCT components is supplied to a delay circuit 105 and a code amount control circuit 106.

Figure 4:
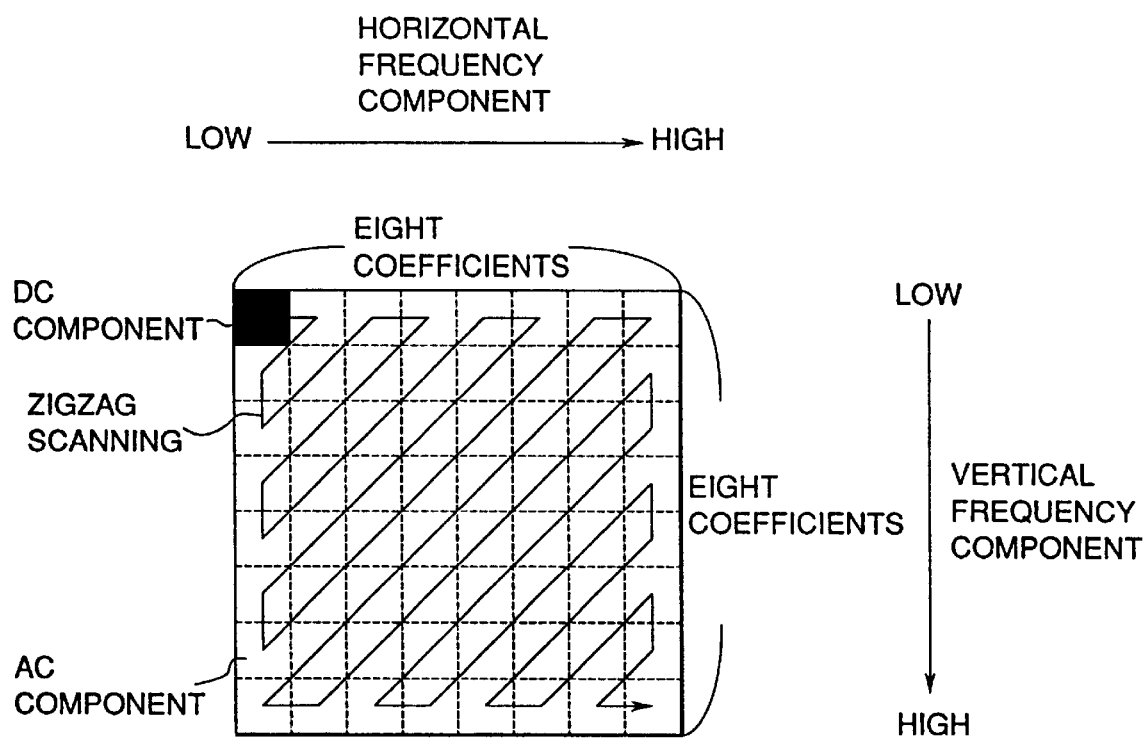
FIG. 4 is a diagram for explaining DCT transformed block data.

The DCT converted block data will now be described with reference to FIG. 4. In the embodiment, a total of 64 pixels (8 pixels in each of the vertical and lateral directions) are set to one block. FIG. 4 shows the correspondence relation of 64 DCT coefficients obtained by DCT arithmetic operating on the block data. The upper left DC component indicates the mean value of 64 pixels in the block and is called a direct current (DC) coefficient. The remaining 63 DC components are called alternating current (AC) coefficients and indicate magnitudes of AC component electric powers in the block.

Returning to the description of FIG. 3, the code amount control circuit 106 controls quantization steps of a quantization circuit 107 in a manner such that an amount of, when a predetermined number of DCT blocks are collected and coded, is set to an almost constant value. In the embodiment, 30 DCT blocks are set to a fixed length unit for simplicity of explanation.

The delay circuit 105 delays 30 DCT block data by a time which is expended to execute the processes in the code amount control circuit 106.

Each of the DCT block data is outputted from the delay circuit 105 is quantized by the quantization circuit 107.

The quantized DCT block data is zigzag scanned as shown in FIG. 4 and is converted into a one-dimensional data train from a low frequency component of the DCT transformation coefficients to a high frequency component and is coded every DCT block by the variable length coding circuit 108.

The variable length coded data is supplied to a sync block generation circuit 109, by which sync blocks are generated.

A construction of the sync block in the embodiment will now be described.

Figure 5:
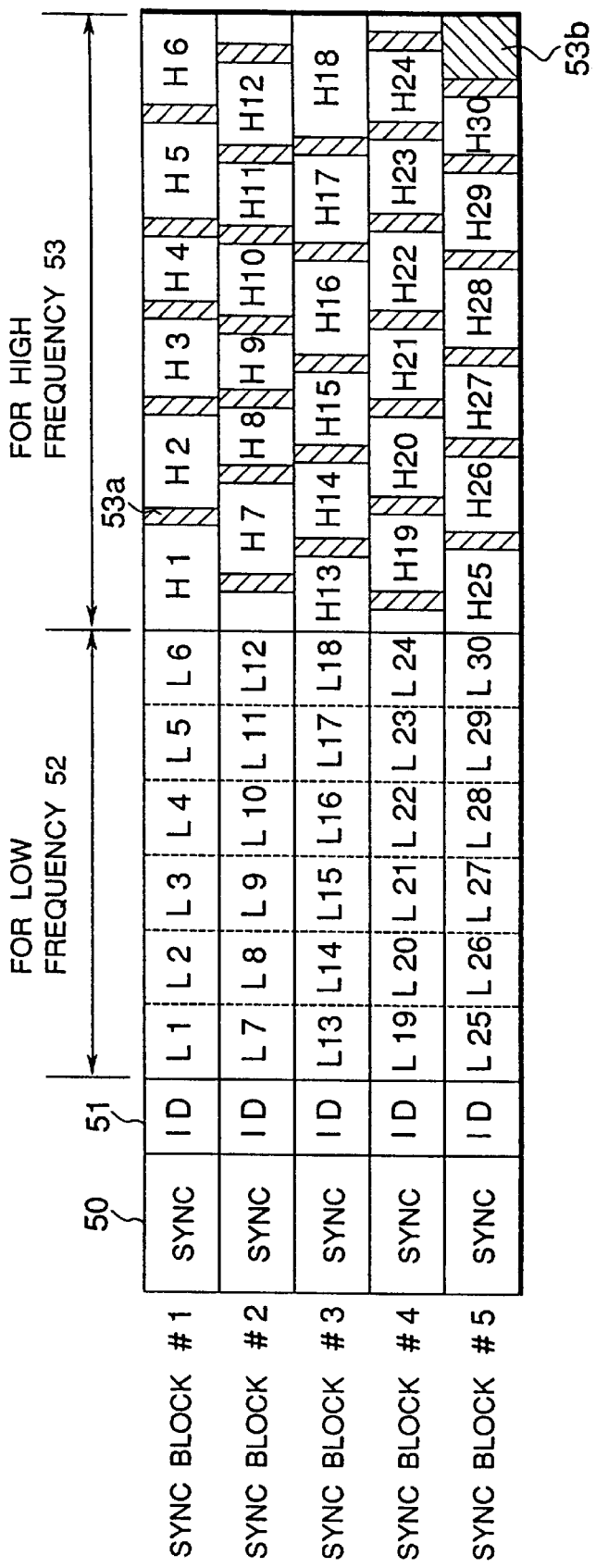
FIG. 5 is a diagram showing a construction of sync blocks in the embodiment.

FIG. 5 is a diagram showing a construction of the sync block in the embodiment.

In FIG. 5, each sync block has synchronization information (SYNC) 50, identification information (ID) 51, and coding data 52 and 53 from the head.

The coding data is divided into two regions 52 and 53 and inserted into the sync block.

The region 52 is used for the coding data of the low frequency component of the DCT transformation coefficient. The region 53 is used for the coding data of the high frequency component of the DCT transformation coefficient.

In the embodiment, the data of a predetermined code amount is sequentially written into the region 52 of each sync block in accordance with the order from the coding data of the low frequency components of the DCT transformation coefficients of six blocks. The coding data of the high frequency components of the DCT transformation coefficients which could not be written into the region 52 is written into the regions 53 of five sync blocks after an ID code for an End of Block (EOB) of each DCT block unit is added to such coding data. More specifically, $L_n$ and $H_n$ shown in FIG. 5 are multiplied and the coding data of one DCT block is enclosed (n is an integer from 1 to 30). Each $L_n$ has a predetermined amount of code, while the amount of code of each $H_n$ differs.

The EOB is written in a hatched region 53a shown in FIG. 5. A hatched region 53b shown in the region 53 of the sync block #5 in FIG. 5 denotes a space region which is not yet used.

In the embodiment, 30 blocks are set to one unit and quantizing characteristics (for instance, quantization steps) are controlled so that the coding data of 30 DCT blocks is enclosed in five such blocks.

Returning to the explanation of FIG. 3, an error detection correction code is added to each sync block data with the above construction by an error detection correction coding circuit (ECC) 110.

The data which is outputted. from the ECC circuit 110 is subjected to a predetermined modulating process by a modulation circuit 111 and is recorded onto a magnetic tape 113 by a recording head 112.

Figure 6:
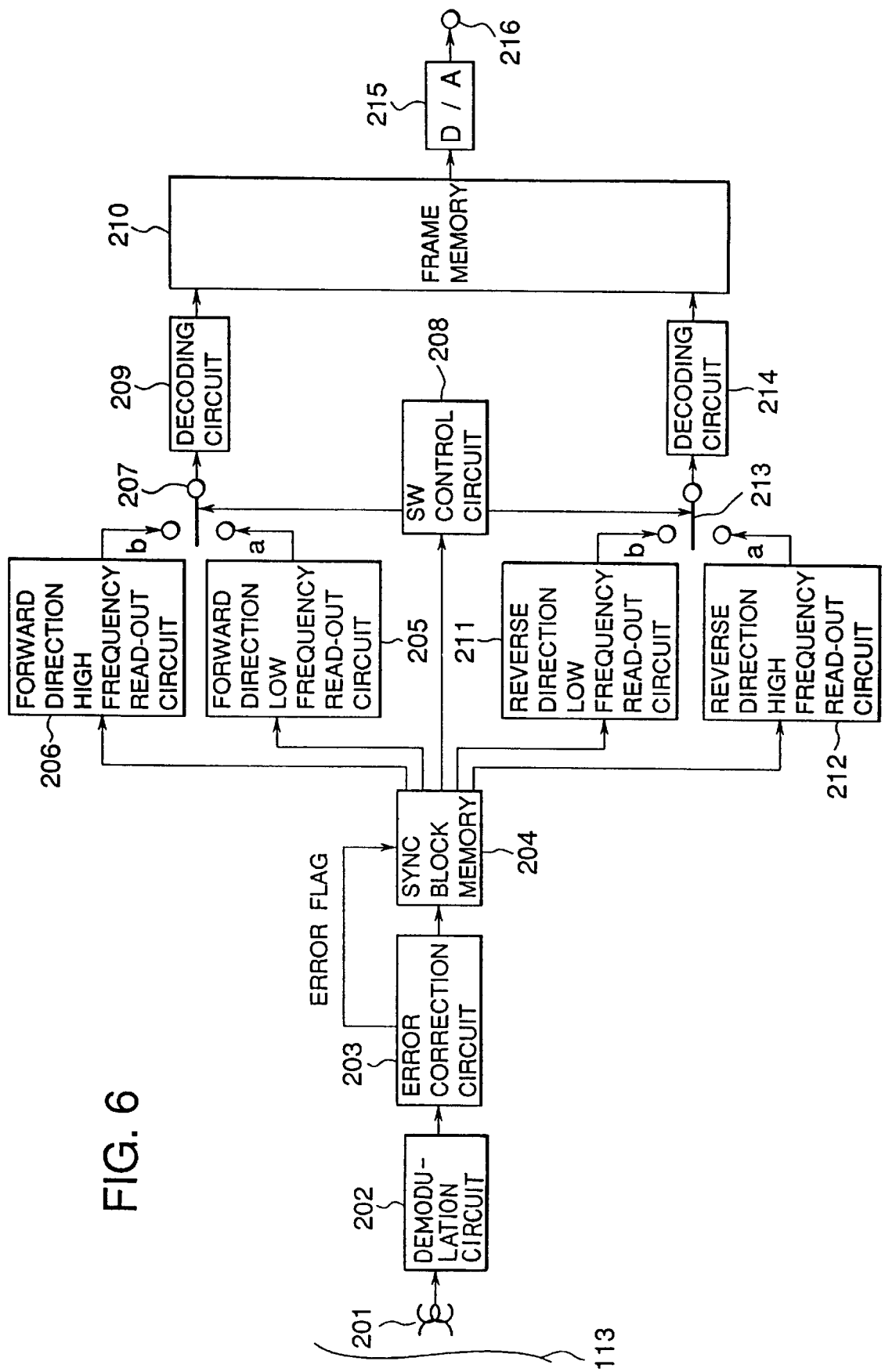
FIG. 6 is a block diagram of a digital reproducing apparatus of the embodiment according to the invention.

FIG. 6 is a block diagram of a digital reproducing apparatus of the embodiment. In FIG. 6, the portions corresponding to those shown in FIG. 3 are designated by the same reference numerals and their descriptions are omitted here.

In FIG. 6, the data recorded on the magnetic tape 113 is read out by the reproducing head 112. The read-out data is subjected to a predetermined demodulating process by a demodulation circuit 202 and is supplied to an error correction circuit 203.

The error correction circuit 203 corrects erroneous data by using the error detection correction code which was added in the recording mode. With respect to a sync block in which uncorrectable data occurs, an error flag is outputted to a sync block memory 204.

The sync block memory 204 stores the error corrected coding data on a sync block unit basis.

The error correction circuit 203 outputs an error flag to the sync block in which the error uncorrectable data exists.

That is, the error correction circuit 203 generates "1" in the case where the sync block has error uncorrectable data and generates "0" when no error uncorrectable data exists on a sync block unit basis. The value "1" or "0" is written into a predetermined region in the sync block memory 204.

Figure 7:
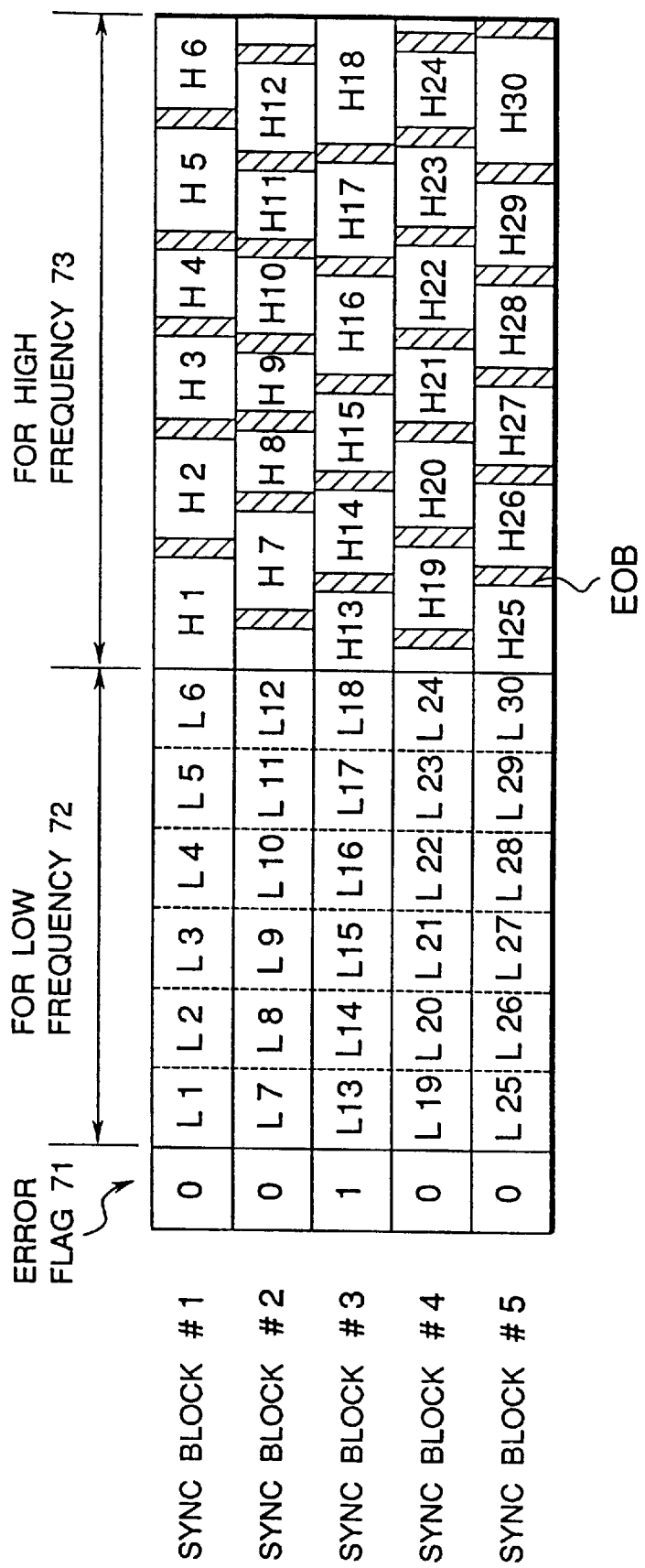
FIG. 7 is a diagram showing schematically an internal structure of a sync block memory 204.

FIG. 7 schematically shows an internal structure of the sync block memory 204.

The error flag outputted from the error correction circuit 203 is written into a region 71.

The coding data of the low frequency component of the DCT transformation coefficient in the region 52 (refer to FIG. 5) of the sync block is written into a region 72. The coding data of the high frequency component of the DCT transformation coefficient in the region 53 (refer to FIG. 5) of the sync block is written into a region 73.

$L_1$ to $L_{30}$ in the region 72 indicate coding data of the low frequency components of the DCT blocks #1 to #30. $H_1$ to $H_{30}$ denote coding data of the high frequency components of the DCT blocks #1 to #30. A hatched portion indicates a delimiter code EOB.

In the case of reading out the coding data for every block from the memory 204, since the coding data of the low frequency components of the DCT transformation coefficient of each DCT block has been stored at a predetermined memory location in the region 72 in the memory 204, it can be sequentially read out. However, although the memory location of the coding data of the high frequency components of each DCT block has been stored in the region 73 in the memory 204, since the particular position in the region 73 is unspecified, the coding data of the high frequency components is sequentially read out on the basis of the EOB.

A forward direction low frequency data read-out circuit 205 sequentially reads out the coding data $L_1$ to $L_{30}$ of the low frequency components in accordance with the order from the head address, in the region 72 in the sync block memory 204 (forward direction decoding mode).

A forward direction high frequency data read-out circuit 206 sequentially reads out the coding data $H_1$ to $H_{30}$ of the high frequency components in accordance with the order from the head address in the region 73 in the sync block memory 204 on the basis of the EOB.

The coding data $L_1$ to $L_{30}$ of low frequencies and coding data $H_1$ to $H_{30}$ of high frequencies which were read out by the forward direction low frequency read-out circuit 205 and the forward direction high frequency read-out circuit 206 are supplied to contacts (a) and (b) of a switch 207.

The switch 207 is controlled by a switch control circuit 208 so that the coding data of low frequencies continues after the coding data of the high frequencies of each DCT block.

Since a decoding circuit 209 restores the image data by executing processes opposite to the processes upon coding, their detailed descriptions are omitted here. The decoding circuit 209 restores the image data by executing a variable length decoding, a reverse quantization, and reverse DCT transformation to the coding data of each DCT block which is supplied from the switch 207. The restored image data is inputted to a frame memory 210.

On the other hand, a reverse direction low frequency data read-out circuit 211 sequentially reads out the coding data $L_1$ to $L_{30}$ in the region 72 in the sync block memory 204 in accordance with the order opposite to that of the low frequency read-out circuit 205, namely, in accordance with the order from $L_{30}$ to $L_1$.

A reverse direction high frequency data read-out circuit 212 reads out the coding data $H_1$ to $H_{30}$ of the high frequencies in the region 73 in the sync block memory 204 in accordance with the order opposite to that of the forward direction high frequency read-out circuit 206, namely, in accordance with the order from $H_{30}$ to $H_1$ (reverse direction decoding mode).

In case of reading out data on a bit unit basis, it is convenient that the EOB be set to the same bit train even in case of reading in the direction from either of the LSB or MSB.

The coding data $L_{30}$ to $L_1$ of the low frequencies and the coding data $H_{30}$ to $H_1$ of the high frequencies which were read out by the reverse direction low frequency read-out circuit 211 and reverse direction high frequency read-out circuit 212 are supplied to contacts (a) and (b) of a switch 213.

The switch 213 is controlled by the switch control circuit 208 in a manner such that the coding data of the high frequencies continues after the coding data of the low frequencies of each DCT block.

A decoding circuit 214 restores the image data by executing the variable length decoding, reverse quantization, and reverse DCT transformation to the coding data of each DCT block which is supplied from the switch 213 in a manner similar to the decoding circuit 209. The restored image data is inputted to the frame memory 210.

As shown in FIG. 7, it is now assumed that an error has occurred in the sync block #3 and the error flag has been set to "1" in the sync block memory 204.

The switch control circuit 208 refers to the error flag region 71 in the sync block memory 204 and controls the switches 207 and 213 as mentioned above and restores the image data so long as the error flag is not set to "1".

That is, since the image data is restored in both of the forward direction decoding mode and the reverse direction decoding mode, the block is restored in two decoding modes. However, it is sufficient that the image data restored by either one of the decoding modes be read out from the frame memory 210. For example, in the embodiment, the image data restored in the forward direction decoding mode is outputted to the post stage.

On the other hand, in the case where the error flag has been set to "1", with respect to the sync block with such an error flag, the switches 207 and 213 are held in a state in which they are connected to the contact (a).

That is, in the example of FIG. 7, apart of $H_{13}$ and parts of $H_{14}$ to $H_{17}$ and $H_{18}$ are ignored. With respect to those DCT blocks #13 to #18, they are decoded using only the low frequency components.

In general, a circuit comprising the circuits 205 to 209 sequentially reads out the coding data from the head address and restores the image data of each DCT block using the coding data of the low and high frequencies. However, for a sync block having the error flag, the image data of the DCT block is restored using only the coding data of low frequencies. The restored image data is stored into the frame memory 210.

On the other hand, a circuit comprising the circuits 208 and 211 to 214 reads out the coding data in accordance with the order opposite to that mentioned above and restores the image data of each DCT block using the coding data of the low and high frequencies and writes the restored image data into the frame memory 210. However, for sync blocks following the sync block having the error flag, the reading operation from the memory 204 is stopped and the writing operation into the frame memory 210 is also stopped.

As mentioned above, in the sync blocks, the circuits 205 to 207 and 209 properly restores the image data by using the coding data of low and high frequencies from the first sync block to the sync block just before the sync block having errors in the forward direction. The circuits 211 to 214 properly restore the image data by using the coding data of low and high frequencies from the last sync block to the sync block just before the sync block having errors in the reverse direction.

With respect to the DCT blocks included in the sync block with errors, the circuits 205 to 207 and 209 reproduce the image data using only the low frequency components.

As mentioned above, when the image data is stored into the frame memory 210, it is read out and supplied to a D/A converting circuit 215 in accordance with the raster scanning order and is converted into an analog signal. The analog signal is outputted to the outside from an output terminal 216.

In the embodiment, with regard to the DCT blocks included in the sync block having errors, the circuits 205 to 207 and 209 reproduce the image data using only the low frequency components. However, the circuits 211 to 214 can also reproduce the image data using only the low frequency components.

For the errors of the sync block unit, a deterioration of the picture quality can be minimized by the construction of the sync block and decoding method mentioned above. Even in a special reproducing mode, a reproduced image of good picture quality can be obtained.

Figure 1:
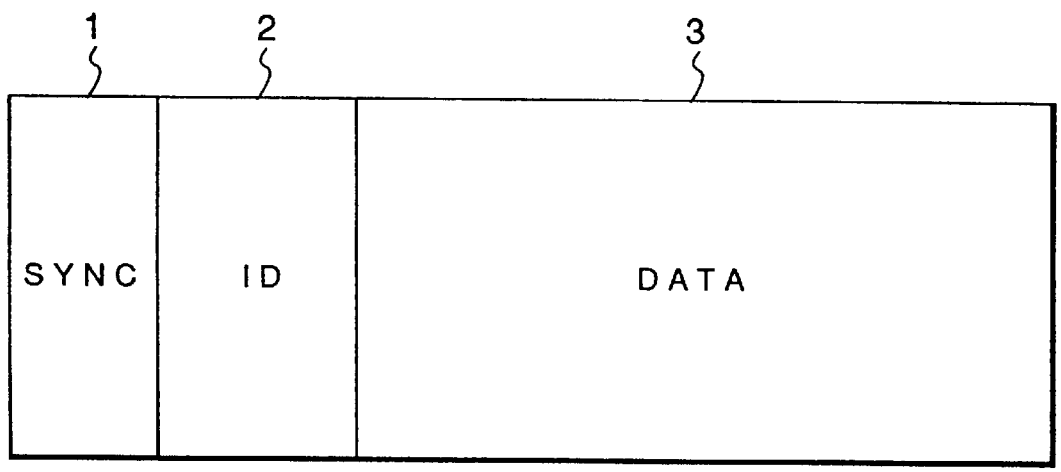
FIG. 1 is an explanatory diagram showing a construction of sync blocks.
Figure 2:
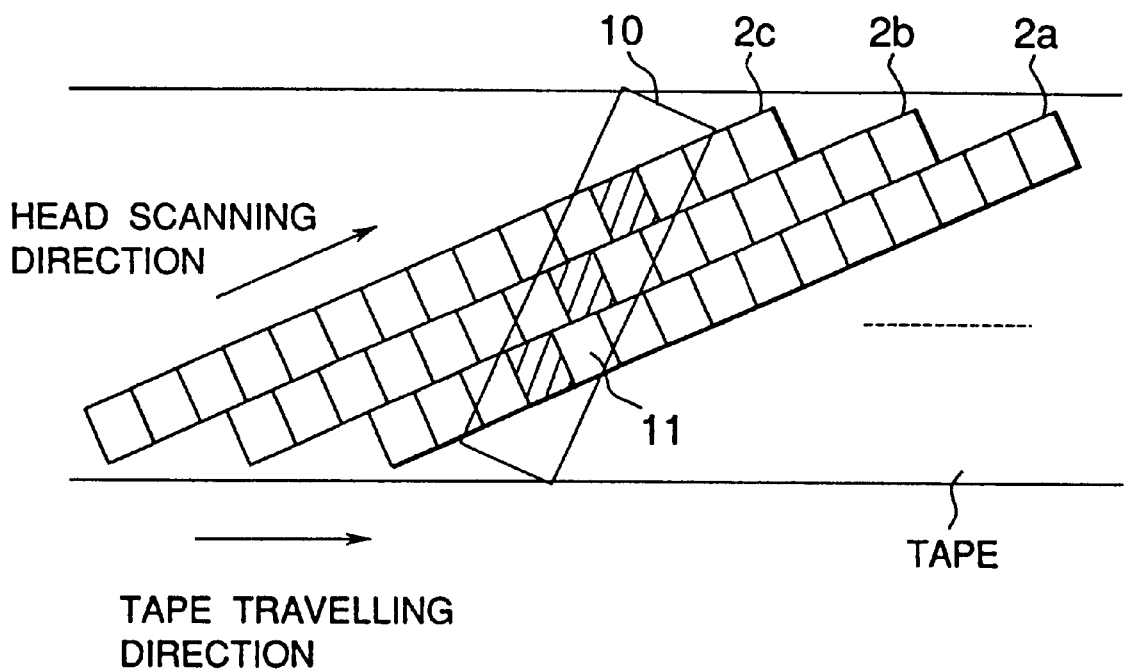
FIG. 2 is an explanatory diagram showing an arrangement of sync blocks on a tape.

The reason why such a good image is obtained will now be described with reference to FIG. 2. In a high speed reproducing mode, for the sync block 11 in which only a part could be scanned by the reproducing head, the data arranged in the rear portion in the sync block 11 cannot be taken out in the conventional apparatus, so that there are problems such that the data necessary for the expanding process cannot be fully prepared and the whole image data existing in the sync block 11 cannot be reproduced. However, by constructing the sync block as in the embodiment, since the data for the low frequency portion of the data which was DCT transformed and coded is arranged in the front portion of the sync block, the image signal can be restored even from a sync block in which only a part of the image data can be taken out. Therefore, many more and better picture plane regions can be reproduced on the screen.

The present invention can be embodied in many other forms without departing from the spirit and main features of the invention.

For example, in the description of the above embodiment, two reading and decoding circuit systems such as circuits 205, 206, 207, and 209 and circuits 211, 212, 213, and 214 have been provided. However, as already described with respect to one of those, circuits, it is also possible to construct the apparatus in a manner such that the reading and decoding operations are first executed from the head address an decoding is executed using only the low frequency components for a sync block having the error flag and, after that, the reading and decoding operations are executed in accordance with the opposite order from the last address.

In the embodiment, only one example has been shown and described with respect to the number of sync blocks corresponding to the DCT blocks or their relations and the number of sync blocks and their relations can be arbitrarily set. The fixed length unit of the code amount and the size of the DCT block can be also similarly arbitrarily set.

In other words, the foregoing description of embodiment has been given for illustrative purposes only and not to be construed as imposing any limitation in any respect.

The scope of the invention is, therefore, to be determined solely by the following claims and not limited by the text of the specification and alterations made within a scope equivalent to the scope of the claims fall within the true spirit and scope of the invention.

What is claimed is:

1. A coding apparatus comprising:
a) block forming means for dividing an input image signal into blocks;
b) coding means for executing a variable length coding to the divided blocks using a variable-length coding to form coded data;
c) producing means for producing a sync block of a fixed length from the coded data, the sync block having first and second regions, each such region having a fixed length, with the first region including a predetermined amount of a low frequency component of the coded data which is extracted from a predetermined number of blocks on an each block basis, said predetermined number being equal to or greater than two, with the second region including high frequency components of the coded data which is arranged in an unfixed number of blocks,
wherein no first region is arranged after a second region throughout the sync block.

2. An apparatus according to claim 1, further comprising:
an adder for adding an error check code for error checking to the sync block data produced by said producing means.

3. An apparatus according to claim 2, further comprising:
a block recorder for recording the sync block data output from said adder.

4. An apparatus according to claim 3, further comprising:
a block reproducer for reproducing the coded data from a recording medium.

5. An apparatus according to claim 1, wherein said coding means codes the blocks divided by said block forming means in such a manner that an amount of codes generated by coding data of m blocks is within a predetermined range of a code amount, with m being an integer equal to or greater than two.

6. A coding method comprising the steps of:
a) a block forming step of dividing an input image signal into blocks;
b) a coding step of executing a variable length coding to the divided blocks using a variable-length coding to form coded data;
c) a producing step of producing a sync block of a fixed length from the coded data, the sync block having first and second regions, each such region having a fixed length, with the first region including a predetermined amount of a low frequency component of the coded data which is extracted from a predetermined number of blocks on an each block basis, said predetermined number being equal to or greater than two, with the second region including high frequency components of the coded data which is arranged in an unfixed number of blocks,
wherein no first region is arranged after a second region throughout the sync block.

7. The method according to claim 6, further comprising:
an adding step of adding an error check code for error checking to the sync block data produced by said producing step.

8. The method according to claim 7, further comprising:
a recording step of recording the sync block data output by said adding step.

9. The method according to claim 8, further comprising:
a reproducing step of reproducing the coded data from a recording medium.

10. The method according to claim 6, wherein said coding step codes the blocks divided in said block forming step in such a manner that an amount of codes generated by coding data of m blocks is within a predetermined range of a code amount, with m being an integer equal to or greater than two.

* * * * *

UNITED STATES PATENT AND TRADEMARK OFFICE
CERTIFICATE OF CORRECTION

PATENT NO. : 6,539,057 B1
DATED : March 25, 2003
INVENTOR(S) : Hidenori Hoshi

It is certified that error appears in the above-identified patent and that said Letters Patent is hereby corrected as shown below:

Column 2,
Line 32, "20" should be deleted; and
Line 54, "-the" should read -- the --.

Column 3,
Line 27, "direction×8" should read -- direction × 8 --; and
Line 53, "is" should be deleted.

Column 4,
Line 15, "components-of" should read -- components of --; and
Line 37, "outputted." should read -- outputted --.

Column 6,
Line 34, "apart" should read -- a part --.

Column 7,
Line 37, "those," should read -- those --; and
Line 56, "specification" should read -- specification, --.

Signed and Sealed this

Sixteenth Day of August, 2005

JON W. DUDAS
*Director of the United States Patent and Trademark Office*